United States Patent [19]

Tsurumi et al.

[11] Patent Number: 5,275,998

[45] Date of Patent: Jan. 4, 1994

[54] PROCESS OF PREPARING CATALYST SUPPORTING HIGHLY DISPERSED METAL PARTICLES

[75] Inventors: Kazunori Tsurumi; Haruko Sugimoto; Nobuo Yamamoto; Toshihide Nakamura, all of Kanagawa, Japan; Paul Stonehart, Madison, Conn.

[73] Assignees: Tanaka Kikinzoku Kogyo K.K., Tokyo, Japan; Stonehart Associates Inc., Madison, Conn.

[21] Appl. No.: 985,206

[22] Filed: Dec. 3, 1992

[30] Foreign Application Priority Data

Dec. 4, 1991 [JP] Japan ................................ 3-348730

[51] Int. Cl.$^5$ .................... B01J 23/42; B01J 23/44; B01J 23/46
[52] U.S. Cl. .................................. 502/339; 502/325
[58] Field of Search ............... 502/185, 325, 333, 334, 502/339

[56] References Cited

U.S. PATENT DOCUMENTS 3,992,331  11/1976  Petrow et al. ................ 502/339
4,956,331  9/1990   Tsurumi et al. ............... 502/339

Primary Examiner—W. J. Shine
Attorney, Agent, or Firm—Sughrue, Mion, Zinn, Macpeak & Seas

[57] ABSTRACT

Disclosed is a process of preparing a catalyst supporting highly metal particles comprising, in the presence of ethylene and/or acetylene in a solution containing a metal-containing ion and a support on which metal particles produced by reduction of the metal-containing ion are supported, reducing by means of a reductant the metal-containing ion to the corresponding metal particles which are then supported on the support. According to the process of this invention, because of the presence of the ethylene and/or acetylene which is supposed to have a function of depressing the deposition of new metal particles present around the metal particles supported on the support, that is, the growth of the metal particles and another function of preventing the agglomeration among the metal particles supported, the catalyst of the desired properties can be prepared.

3 Claims, 7 Drawing Sheets

Particle Size Distribution
Average Particle Size: 17Å

Particle Size Distribution
Average Particle Size: 20Å

Particle Size Distribution
Average Particle Size: 46 Å

5,275,998

PROCESS OF PREPARING CATALYST SUPPORTING HIGHLY DISPERSED METAL PARTICLES

BACKGROUND OF THE INVENTION

The present invention relates to a process of preparing a catalyst supporting highly dispersed metal particles utilized in the field of catalyst.

While support-type metal catalysts have been widely employed in various chemical reactions, it is required to reduce the particle diameter of the metal particles as much as possible to be uniformly supported on a support for effectively utilizing the catalytically active metals especially when such an expensive catalyst metal as a precious metal is employed. In order to attain this requirement, many attempts have been made to support metal particles of fine particles on a support.

Heretofore, a metal ion in a solution has been reduced by means of a reductant to its metallic state to form metal particles. In general, in order to obtain the metal fine particles, the reduction is proposed to be carried out under the conditions that many nuclei are made to be formed of which subsequent growth is depressed. However, in practice, the metal particles once generated are likely to agglomerate with the increase of their particle size. It was quite difficult to produce metal particles of monodispersion having narrow particle size distribution of which particle size is not more than 30 Å. Moreover, the amount of the metal particles capable of supporting on the support in the monodispersion state is restricted depending on the surface area of the support on which the metal particles are supported. It was difficult to support the metal particles on a support having a low specific surface area in the monodispersion state which invites more excellent catalytic effects.

Although, in order to overcome these problems, the metal particles are obtained by adding a polymer surfactant or such a substance as sulfur colloid as protective colloid to a solution containing a metal-containing ion to reduce the metal containing ion, this process possesses the following disadvantages. (1) The lower limit of the metal particles is about 30 Å, (2) the degree of monodispersion on the support is poor, and (3) the metal particles produced are difficult to be separated from the remaining protective colloid, and during the washing of removing the colloid; the particles are likely to agglomerate to widen the particle size distribution range.

SUMMARY OF THE INVENTION

The present invention has been made to overcome the above-mentioned problems.

An object of the present invention is to provide a process of preparing a catalyst of which a particle size is less than that of a conventional catalyst.

Another object of the invention is to provide a process of preparing a catalyst which supports metal particles of monodispersion.

A further object of the invention is to provide a process of preparing a catalyst having narrow particle size distribution.

The present invention is a process of preparing a catalyst supporting highly dispersed metal particles comprising, in the presence of ethylene and/or acetylene in a solution containing a metal-containing ion and a support on which metal particles produced by reduction of the metal-containing ion are supported, reducing by means of a reductant the metal-containing ion to the corresponding metal particles which are then supported on the support.

According to the process, because of the presence of the ethylene and/or acetylene which is supposed to have a function of depressing the deposition of a new metal particle present around the metal particles supported on the support, that is, the growth of the metal particles and another function of preventing the agglomeration among the metal particles supported, the catalyst of excellent properties having the metal particles supported and monodispersed on the support with the narrow particle size distribution can be prepared of which an average particle size may be not more than 20 Å. After the preparation of the catalyst, the ethylene and/or acetylene can be easily taken out from the system so that no harmful effects are produced by the employment of these gases.

The process of the invention is especially useful when applied to the preparation of the catalyst supported with such a precious metal as palladium, rhodium, ruthenium, iridium and platinum, and the invention enables the further elevation of the activities of the catalytically active precious metal catalyst.

A variety of reductants may be employed in the present invention such as hydrazine hydrochloride, hydrazine sulfate, sodium borohydride, ethanol, methanol, hydrazine hydrate and L-ascorbic acid. Even if a strong reductant is employed, the catalyst supporting the metal particles highly dispersed can be obtained so that this invention enables the preparation of the catalyst supporting the metal particles highly dispersed.

DETAILED DESCRIPTION OF THE INVENTION

Figure 1:
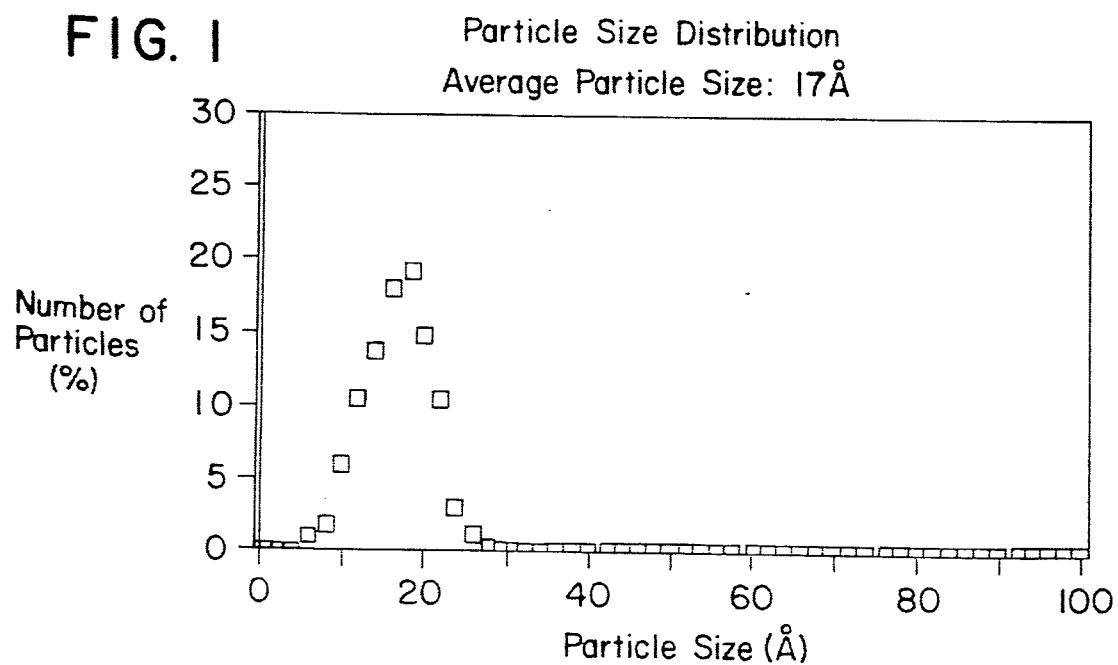
FIG. 1 is a graph showing the particle size distribution of the carbon catalyst supporting the platinum obtained in Example 1.

Although an ion containing a metal ordinarily employed as a catalyst metal may be employed without limitation as a metal-containing ion of the present invention, it is preferable to employ an ion containing such a catalytically active metal as palladium, rhodium, ruthenium, iridium and platinum, that is, a single metal ion and a metal complex ion composed of a central metal and other ligands coordinating the central metal.

Although a reductant reducing the said metal-containing ion is not especially restricted as long as it does not react with ethylene and acetylene to lower its reduction efficiency and an ordinary reductant may be employed, it is preferable to employed one or more reductants selected from the group consisting of hydrazine hydrochloride, hydrazine sulfate, sodium borohydride, ethanol, methanol, hydrazine hydrate and L-ascorbic acid.

The support employed is not especially restricted and such a conventional inorganic oxide support as silica and alumina, and a carbon support and the like may be employed without limitation.

In order to support the metal to the support employing these respective components, the support is suspended in the solution, ordinarily the aqueous solution dissolving the metal-containing ion followed by reduction of the metal-containing ion to the corresponding metal by means of the reductant under the condition that the ethylene and/or acetylene is always in contact with the support to support the metal thereon with the high dispersion state.

The reduction conditions may be the same as those for the conventional reduction employing no ethylene and/or acetylene. For instance, the reduction of the above metal-containing ion may be conducted under the conditions of 5° to 60° C., preferably 25° to 45° C. of the solution temperature and 1.0 to 2.0 molar equivalence of the reductant to an amount of the supported metal.

The catalyst supporting the metal particles of monodispersion with uniform particle size less than about 20 Å can be obtained according to the above process which has not been obtained according to a conventional process. The effects the ethylene and/or acetylene exhibit in the formation of the metal particles are supposed to be accounted for the inhibition of the agglomeration among the metal particles by mean of the ethylene and/or acetylene adsorbing and covering the surface of the metal particles to prevent the growth of the said metal particle nuclei by the deposition of a new metal atom on the surface of the metal nuclei.

The supply of the ethylene and/or acetylene into the solution in the present invention is desirably conducted by means of bubbling, and as mentioned earlier the supply speed thereof is so adjusted that the ethylene and/or acetylene always exists on the support. Because of the low solubility of the ethylene and/or acetylene into the aqueous solution, sufficient effects can not be sometimes expected. In such a case, the ethylene and/or acetylene may be dissolved into such an organic solvent as acetaldehyde to prepare an organic solution which is then supplied, whereby the ethylene and/or acetylene is allowed to be in sufficient contact with the support and with the metal particles supported on the support to further elevate the effect of depressing the formation of the particles and the agglomeration of the particles.

Although most of the ethylene and/or acetylene employed in the reduction escapes from the solution into air, part of the ethylene and/or acetylene remains on the support in the state of supporting. The ethylene and/or acetylene may be removed after the filtration and the washing of the catalyst supporting the metal particles by heating the catalyst in a reduction atmosphere, but it may be also easily removed by standing the catalyst containing water in air for gradually oxidizing and removing the ethylene and/or acetylene. During the removing procedure, no growth of the metal particle size occurs.

In the present invention, the degree of fineness of the supported metal can be increased even when such a strong reductant as the hydrazine and the sodium borohydride is employed, and the catalyst supported with the finer and more uniform catalyst metal than that of a conventional catalyst can be prepared.

EXAMPLES

Although Examples of the present invention will be described, these are not intended to restrict the scope of the present invention.

EXAMPLE 1

To an aqueous solution which had been prepared by diluting 12.5 ml of an aqueous solution of chloroplatinic acid (platinum concentration was 200 g/liter) with 1 liter of pure water, 10 g of carbon powder was added and sufficiently dispersed by means of an ultrasonic homogenizer. While an acetylene gas was blown into the solution at the rate of 100 ml/min., the platinum ion was reduced by adding a solution which had been prepared by dissolving 0.88 g of hydrazine hydrate into 100 ml of pure water, followed by the stirring for 16 hours.

Figure 2:
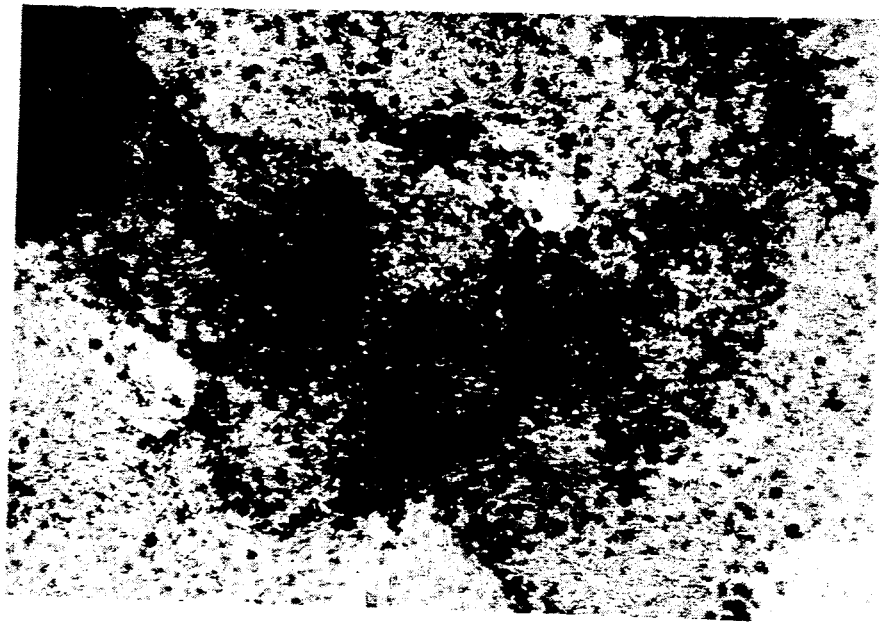
FIG. 2 is a microphotograph of 1,000,000 times of the carbon catalyst supporting the platinum obtained in Example 1.

After the filtration of and the washing with 3 liters of pure water of the suspended solution containing the support were repeated until the pH of the filtrate became 7, the carbon support supporting the platinum was frayed to thinner pieces on an enameled vat to be allowed to stand overnight so as to remove the acetylene. After the drying, the carbon support supporting 20% in weight of the platinum was obtained. The particle size and the particle size distribution of the metal particles of this catalyst were measured by means of X-ray diffraction, and the catalyst was observed by means of an electron microscope. The particle size distribution and a microphotograph of 1,000,000 times are shown in FIGS. 1 and 2, respectively. The graph of FIG. 1 showing the particle size distribution has been prepared by dividing the range of the particle size measured into ranges of every 2 Å and plotting the respective percentages of the particle number belonging to the respective ranges to all the particle number. As shown in FIG. 1, the average particle size of the platinum particles supported on the catalyst was 17 Å, and the width of the particle distribution was narrow as shown in FIG. 1.

EXAMPLE 2

A carbon catalyst supporting platinum and palladium in the molar ratio of 1:1 (the total mole was the same as that of the platinum of Example 1) was prepared in accordance with the following procedures.

To an aqueous solution which had been prepared by diluting 6.25 ml of an aqueous solution of chloroplatinic acid (platinum concentration was 200 g/liter) and 3.4 ml of an aqueous solution of palladium chloride (palladium concentration was 200 g/liter) with 1 liter of pure water, 10 g of carbon powder was added and sufficiently dispersed by means of an ultrasonic homogenizer. While acetylene was blown into the solution at the rate of 100 ml/min., the platinum and rhodium ions were reduced by adding a solution which had been prepared by dissolving 0.88 g of hydrazine hydrate into 100 ml of pure water, followed by the stirring for 16 hours.

Figure 3:
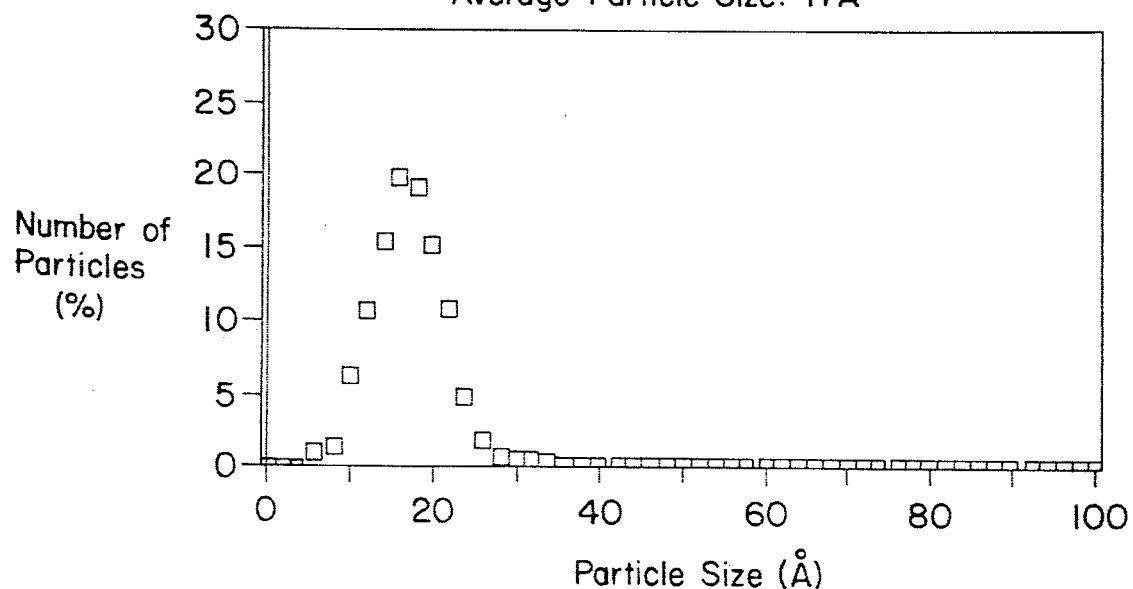
FIG. 3 is a graph showing the particle size distribution of the carbon catalyst supporting the platinum and palladium obtained in Example 2.
Figure 4:
FIG. 4 is a microphotograph of 1,000,000 times of the carbon catalyst supporting the platinum and palladium obtained in Example 2.

Thereafter, the same procedures as those of Example 1 were conducted to obtain a carbon catalyst supporting the platinum and the palladium. The overall amount of the supported platinum and palladium of the platinum-palladium-supported carbon support obtained was 16% in weight. The particle size and the particle size distribution of the metal particles of this catalyst were measured by means of X-ray diffraction, and the catalyst was observed by means of an electron microscope. The particle size distribution and a microphotograph of 1,000,000 times are shown in FIGS. 3 and 4, respectively. As shown in FIG. 3, the average particle size of the platinum-palladium particles supported on the catalyst was 17 Å, and the width of the particle distribution was narrow as shown in FIG. 3.

EXAMPLE 3

To 1 liter of a nitric acid solution of dinitrodiaminoplatinum containing 2.5 g of platinum, 10 g of carbon powder was added and sufficiently dispersed by means of an ultrasonic homogenizer. While acetylene was blown into the solution at the rate of 100 ml/min., the platinum ion was reduced by adding a solution which had been prepared by dissolving 5.19 g of L-ascorbic acid into 100 ml of pure water, followed by the stirring for 16 hours.

Figure 5:
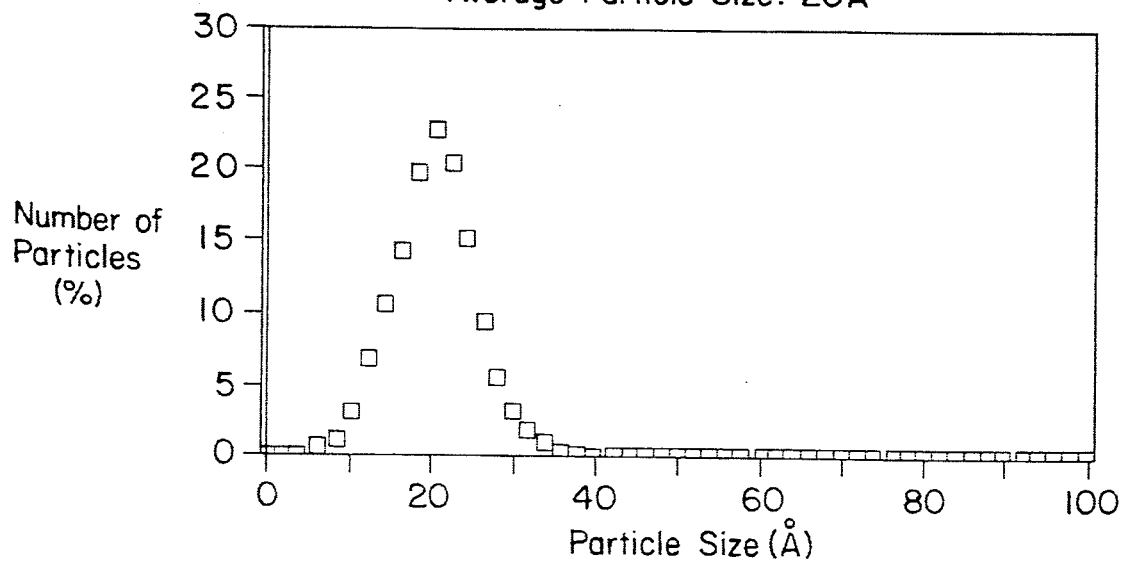
FIG. 5 is a graph showing the particle size distribution of the carbon catalyst supporting the platinum obtained in Example 3.
Figure 6:
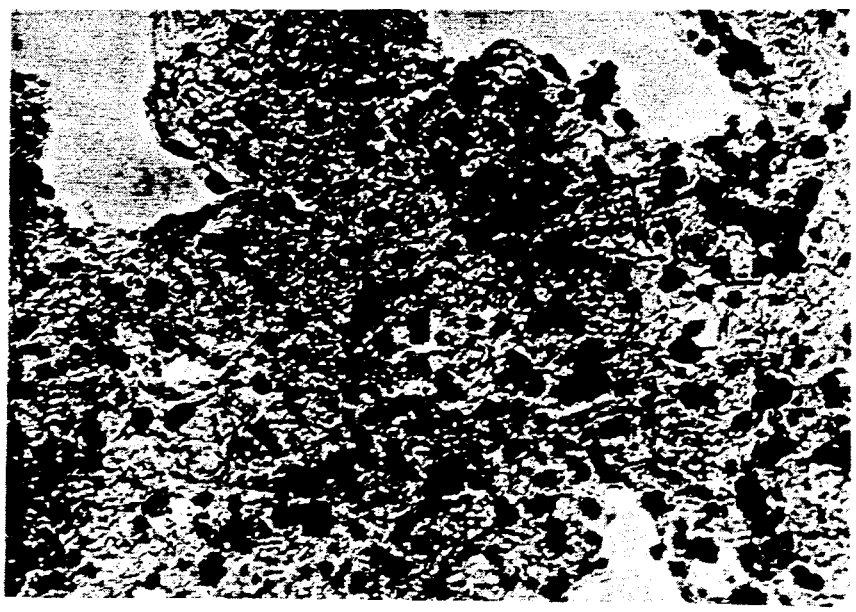
FIG. 6 is a microphotograph of 1,000,000 times of the carbon catalyst supporting the platinum obtained in Example 3.

Thereafter, the same procedures as those of Example 1 were conducted to obtain a carbon catalyst supporting the platinum. The particle size and the particle size distribution of the metal particles of this catalyst were measured by means of X-ray diffraction, and the catalyst was observed by means of an electron microscope. The particle size distribution and a microphotograph of 1,000,000 times are shown in FIGS. 5 and 6, respectively. As shown in FIG. 5, the average particle size of the platinum particles supported on the catalyst was 20 Å, and the width of the particle distribution was narrow as shown in FIG. 5.

Example 4

Figure 7:
FIG. 7 is a microphotograph of 1,000,000 times of the carbon catalyst supporting the platinum obtained in Example 4.

A catalyst supporting platinum particles was prepared according to the same procedures as those of Example 1 except that 100 ml of acetaldehyde was added as a solvent of the acetylene. The particle size of the platinum particles was too small to be measured by means of X-ray diffraction. A microphotograph of 1,000,000 times of this catalyst is shown in FIG. 7.

Example 5

Figure 8:
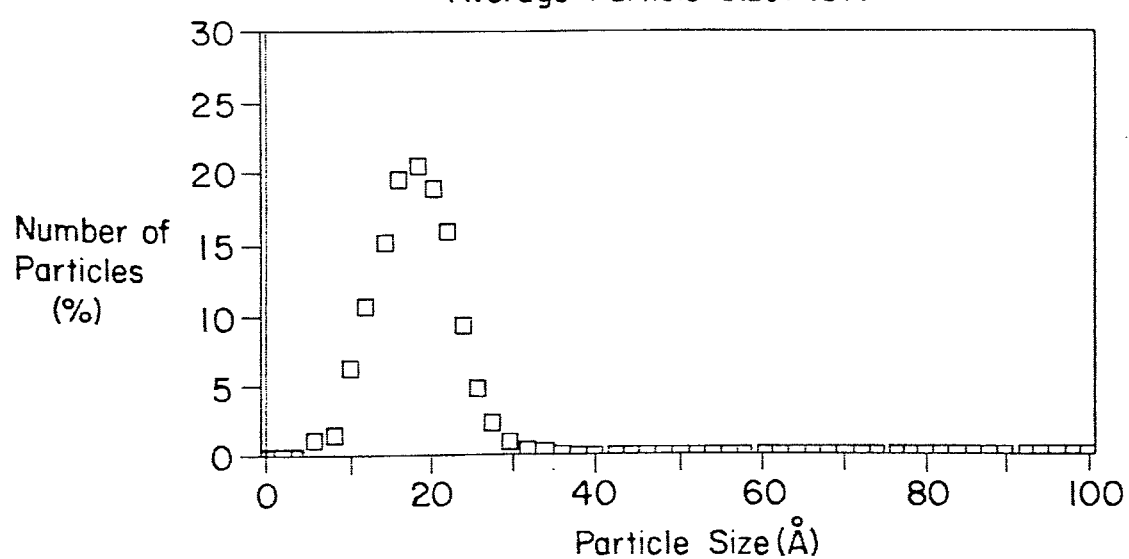
FIG. 8 is a graph showing the particle size distribution of the carbon catalyst supporting the platinum obtained in Example 5.
Figure 9:
FIG. 9 is a microphotograph of 1,000,000 times of the carbon catalyst supporting the platinum obtained in Example 5.

A catalyst supporting platinum particles was prepared according to the same procedures as those of Example 1 except that ethylene was employed in place of the acetylene. The particle size and the particle size distribution of the metal particles of this catalyst were measured by means of X-ray diffraction, and the catalyst was observed by means of an electron microscope. The particle size distribution and a microphotograph of 1,000,000 times are shown in FIGS. 8 and 9, respectively. The average particle size of the platinum particles supported on the catalyst was 18 Å, and the width of the particle distribution was narrow as shown in FIG. 8.

Example 6

A carbon catalyst supporting platinum and rhodium in the molar ratio of 1:1 (the total mole was the same as that of the platinum of Example 1) was prepared in accordance with the same procedures as those of Example 2 except that 3.24 ml of an aqueous solution of rhodium chloride (rhodium concentration was 200 g/liter) was employed in place of the aqueous solution of palladium chloride (palladium concentration was 200 g/liter). The particle size and the particle size distribution of the metal particles of this catalyst were measured by means of X-ray diffraction, and the catalyst was observed by means of an electron microscope. The average particle size of the platinum-rhodium particles supported on the catalyst was 19 Å, and the width of the particle distribution was narrow as that of the catalyst of Example 2. The platinum-rhodium particles were uniformly dispersed on the support.

EXAMPLE 7

A carbon catalyst supporting platinum and iridium in the molar ratio of 2:1 (the total mole was the same as that of the platinum of Example 1) was prepared in accordance with the same procedures as those of Example 2 except that 3.8 ml of an aqueous solution of iridium chloride (iridium concentration was 200 g/liter) and an aqueous solution of chloroplatinic acid (platinum concentration was 200 g/liter) were employed in place of the aqueous solution of palladium chloride (palladium concentration was 200 g/liter). The particle size and the particle size distribution of the metal particles of this catalyst were measured by means of X-ray diffraction, and the catalyst was observed by means of an electron microscope. The average particle size of the platinum-iridium particles supported on the catalyst was 17 Å, and the width of the particle distribution was narrow as that of the catalyst of Example 2. The platinum-iridium particles were uniformly dispersed on the support.

EXAMPLE 8

A carbon catalyst supporting platinum was prepared in accordance with the same procedures as those of Example 1 except that 0.58 g of sodium borohydride was employed as a reductant in place of the hydrazine hydrate. The particle size and the particle size distribution of the metal particles of this catalyst were measured by means of X-ray diffraction, and the catalyst was observed by means of an electron microscope. The average particle size of the platinum particles supported on the catalyst was 20 Å, and the width of the particle distribution was narrow as that of the catalyst of Example 1. The platinum particles were uniformly dispersed on the support.

Example 9

A carbon catalyst supporting platinum was prepared in accordance with the same procedures as those of Example 1 except that powdery active alumina was employed as a support in place of the carbon powder. The particle size and the particle size distribution of the metal particles of this catalyst were measured by means of X-ray diffraction, and the catalyst was observed by means of an electron microscope. The average particle size of the platinum particles supported on the catalyst was 16 Å, and the width of the particle distribution was narrow as that of the catalyst of Example 1. The platinum particles were uniformly dispersed on the alumina support.

Comparative Example 1

Figure 10:
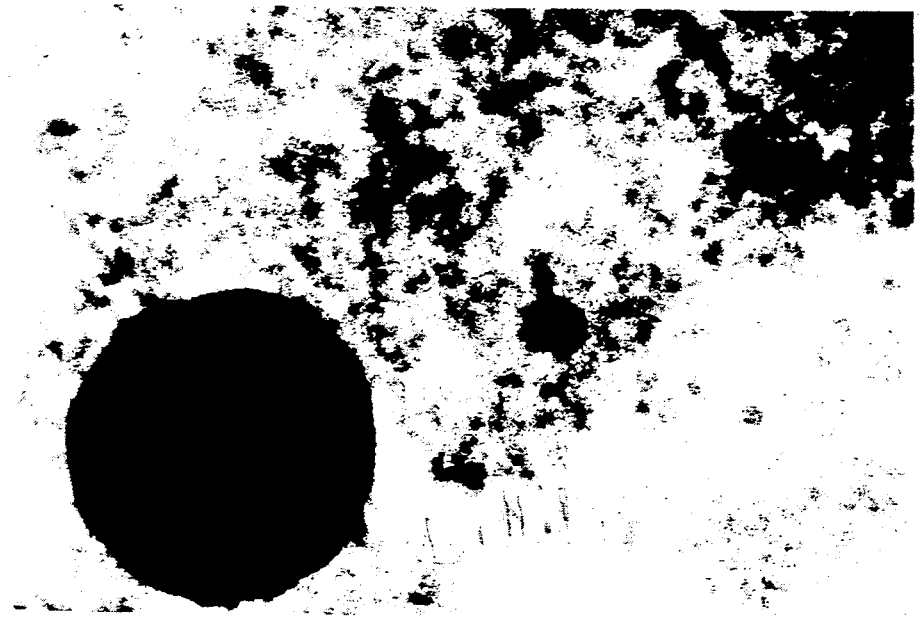
FIG. 10 is a microphotograph of 1,000,000 times of the carbon catalyst supporting the platinum obtained in Comparative Example 1.

A catalyst supporting platinum particles was prepared according to the same procedures as those of Example 1 except that the procedure of bubbling the acetylene was excluded. The particle size and the particle size distribution of the metal particles of this catalyst were measured by means of X-ray diffraction, and the catalyst was observed by means of an electron microscope. A microphotograph of 1,000,000 times are shown in FIG. 10. The average particle size of the platinum particles supported on the catalyst was 46 Å, but the platinum particles agglomerated with each other to become a particle of not less than 0.1 μm.

Comparative Example 2

Figure 11:
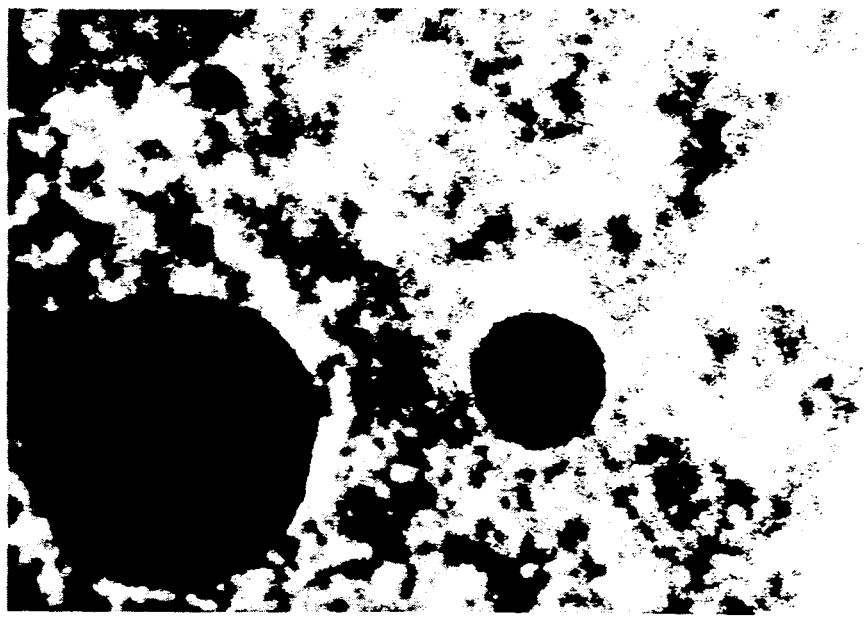
FIG. 11 is a microphotograph of 1,000,000 times of the carbon catalyst supporting the platinum and palladium obtained in Comparative Example 2.

A catalyst supporting platinum and palladium particles was prepared according to the same procedures as those of Example 2 except that the procedure of bubbling the acetylene was excluded. The particle size and the particle size distribution of the metal particles of this catalyst were measured by means of X-ray diffraction, and the catalyst was observed by means of an electron microscope. A microphotograph of 1,000,000 times are shown in FIG. 11. The average particle size of the platinum-palladium particles supported on the catalyst was 48 Å, but the particles agglomerated with each other to become a particle of not less than 0.1 μm.

COMPARATIVE EXAMPLE 3

Figure 12:
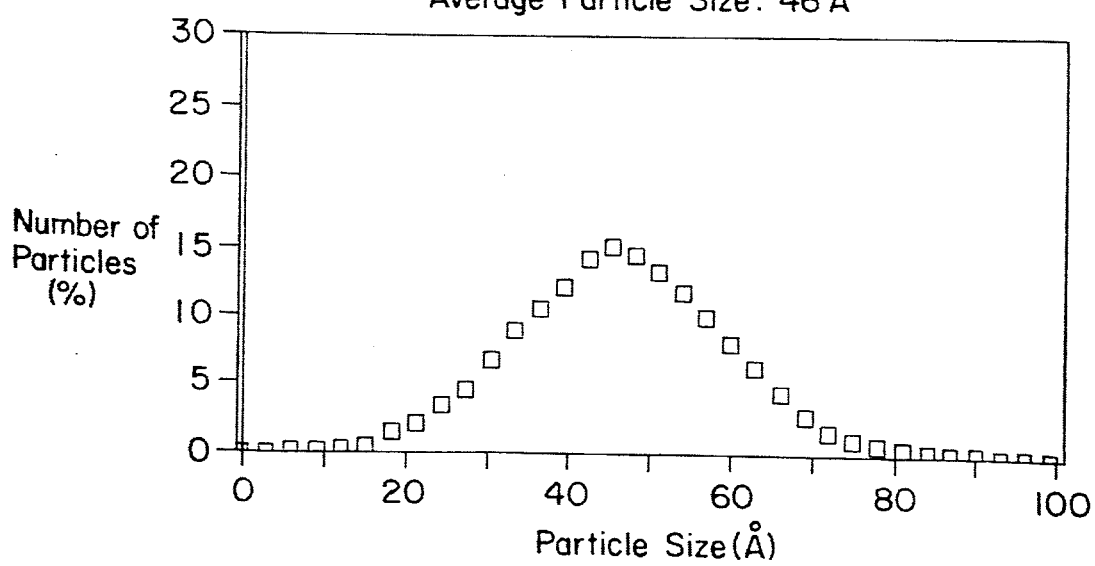
FIG. 12 is a graph showing the particle size distribution of the carbon catalyst supporting the platinum obtained in Comparative Example 3.
Figure 13:
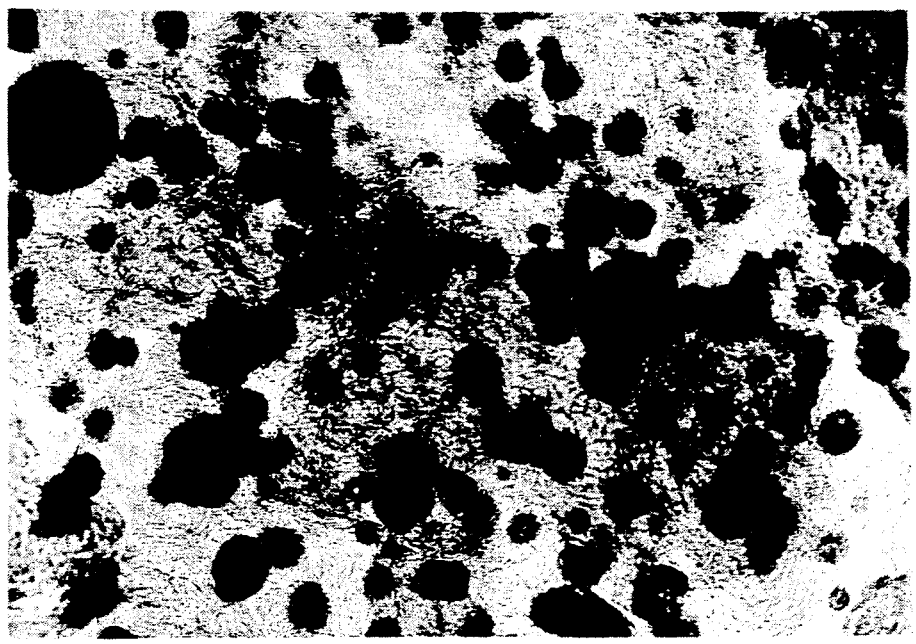
FIG. 13 is a microphotograph of 1,000,000 times of the carbon catalyst supporting the platinum obtained in Comparative Example 3.

A catalyst supporting platinum particles was prepared according to the same procedures as those of Example 3 except that the procedure of bubbling the acetylene was excluded. The particle size and the particle size distribution of the metal particles of this catalyst were measured by means of X-ray diffraction, and the catalyst was observed by means of an electron microscope. Particle size distribution and a microphotograph of 1,000,000 times are shown in FIGS. 12 and 13, respectively. The average particle size of the platinum particles supported on the catalyst was 46 Å.

COMPARATIVE EXAMPLE 4

A catalyst supporting platinum and rhodium particles was prepared according to the same procedures as those of Example 6 except that the procedure of bubbling the acetylene was excluded. The particle size and the particle size distribution of the metal particles of this catalyst were measured by means of X-ray diffraction, and the catalyst was observed by means of an electron microscope. The average particle size of the platinum-rhodium particles supported on the catalyst was 51 Å, and the particles agglomerated with each other to lower the degree of dispersion as Comparative Example 2.

COMPARATIVE EXAMPLE 5

A catalyst supporting platinum and iridium particles was prepared according to the same procedures as those of Example 7 except that the procedure of bubbling the acetylene was excluded. The particle size and the particle size distribution of the metal particles of this catalyst were measured by means of X-ray diffraction, and the catalyst was observed by means of an electron microscope. The average particle size of the platinum-iridium particles supported on the catalyst was 46 Å, and the particles agglomerated with each other to lower the degree of dispersion as Comparative Example 2.

COMPARATIVE EXAMPLE 6

A catalyst supporting platinum particles was prepared according to the same procedures as those of Example 9 except that the procedure of bubbling the acetylene was excluded. The particle size and the particle size distribution of the metal particles of this catalyst were measured by means of X-ray diffraction, and the catalyst was observed by means of an electron microscope. The average particle size of the platinum particles supported on the catalyst was 56 Å, and the platinum particles agglomerated with each other to lower the degree of dispersion as Comparative Example 1.

COMPARATIVE EXAMPLE 7

An alumina catalyst supporting platinum particles was prepared according to the same procedures as those of Example 9 except that the procedure of bubbling the acetylene was excluded. The particle size and the particle size distribution of the metal particles of this catalyst were measured by means of X-ray diffraction, and the catalyst was observed by means of an electron microscope. The average particle size of the platinum particles supported on the catalyst was 53 Å, and the platinum particles agglomerated with each other to lower the degree of dispersion as Comparative Example 1.

COMPARATIVE EXAMPLE 8

Figure 14:
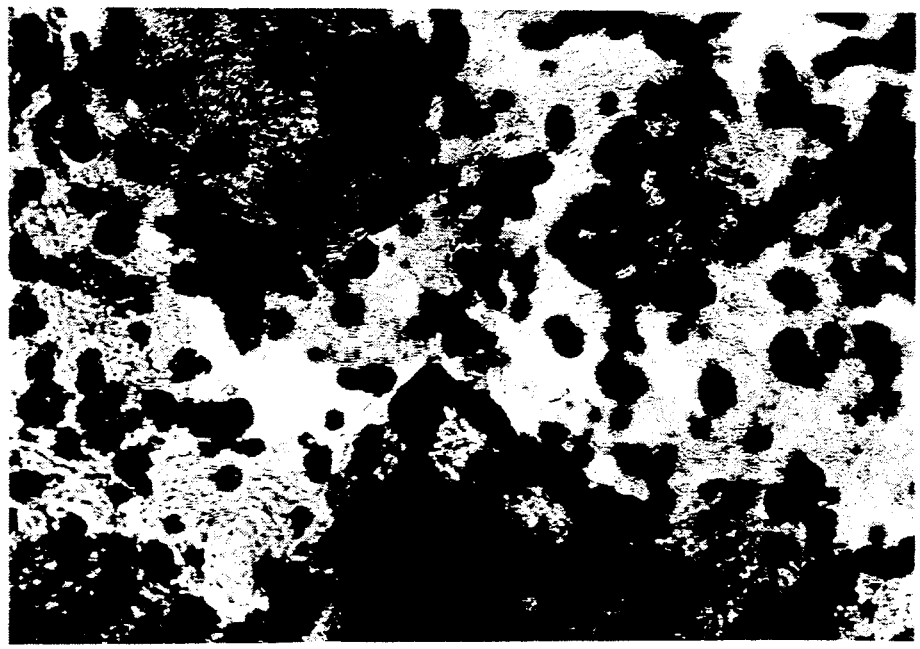
FIG. 14 is a microphotograph of 1,000,000 times of the carbon catalyst supporting the platinum obtained in Prior Art Example 1.

To 1 liter of an aqueous solution of chloroplatinic acid containing 2.5 g of platinum, 10 g of carbon powder was added and sufficiently dispersed by means of a ultrasonic homogenizer. To this solution, 5 g of polyvinyl alcohol was added as protective colloid, and then the platinum ion was reduced by adding 1 liter of methanol and keeping the solution temperature at 70° C. for 6 hours. After the platinum catalyst was prepared according to the above process, the catalyst was filtered and repeatedly washed with pure water until the pH of the filtrate became 7. The protective colloid was removed by the treatment in an inert gas atmosphere at 300° C. for 2 hours (Japanese patent publication No.63-40135). The particle size and the particle size distribution of the metal particles of this catalyst were measured by means of X-ray diffraction, and the catalyst was observed by means of an electron microscope. A microphotograph of 1,000,000 times of this catalyst is shown in FIG. 14. Although the average particle size of the platinum particles supported on the catalyst was 30 Å, a cluster was formed by every several particles.

What is claimed is:

1. A process of preparing a catalyst supporting highly dispersed metal particles having an average particle size of not more than 20 Å comprising, in the presence of ethylene and/or acetylene in a solution containing a metal-containing ion and a support on which metal particles produced by reduction of the metal-containing ion are supported, reducing by means of a reductant the metal-containing ion to the corresponding metal particles which are then supported on the support.

2. The process as claimed in claim 1, wherein the metal of the metal-containing ion is selected from the group consisting of palladium, rhodium, ruthenium, iridium and platinum.

3. The process as claimed in claim 1, wherein the reductant is selected from the group consisting of hydrazine hydrochloride, hydrazine sulfate, sodium borohydride, ethanol, methanol, hydrazine hydrate and L-ascorbic acid.

* * * * *